United States Patent [19]

Loeven

[11] Patent Number: 4,988,994

[45] Date of Patent: Jan. 29, 1991

[54] TRAFFIC MONITORING DEVICE

[75] Inventor: Hans-Gerd Loeven, Duisburg, Fed. Rep. of Germany

[73] Assignee: Robot Foto Und Electronic GmbH U. Co. Kg, Dusseldorf, Fed. Rep. of Germany

[21] Appl. No.: 231,083

[22] Filed: Aug. 11, 1988

[30] Foreign Application Priority Data

Aug. 26, 1987 [DE] Fed. Rep. of Germany ....... 3728401

[51] Int. Cl.$^5$ ............................................. G08G 1/01
[52] U.S. Cl. .................................... 340/936; 340/937
[58] Field of Search .............. 340/936, 937, 938, 933; 342/115

[56] References Cited

U.S. PATENT DOCUMENTS

| | | | |
|---|---|---|---|
| 3,165,373 | 1/1965 | Scott | 340/937 X |
| 3,680,043 | 7/1972 | Angeloni | 340/936 |
| 4,335,383 | 6/1982 | Berry | 342/115 |

OTHER PUBLICATIONS

Hewer, John "High Technology Instruments Foils Hasty", Aug. 1979, pp. 30 and 31.

Gatso Meter (brochure), type 24–the Netherlands, Apr. 1988.

*Primary Examiner*—Joseph A. Orsino
*Assistant Examiner*—Jeffery A. Hofsass
*Attorney, Agent, or Firm*—Lee, Mann, Smith McWilliams & Sweeney

[57] ABSTRACT

A traffic monitoring device mounted in a moving monitoring vehicle comprises a radar device for measuring the relative speed of a vehicle to be detected with respect to the speed of the monitoring vehicle. A speedometer measures the speed of the monitoring vehicle. By means of a releasing mechanism automatically triggered at adjustable limit speeds, a camera is released and the vehicle to be detected is photographed. The relative speed of the vehicle to be detected and the speed of the monitoring device are added in summing means. The sum then corresponds to the absolute speed of the vehicle to be detected. The camera is not released dependent on the relative speed but on the absolute speed of the vehicle to be detected. Thereby, all vehicles exceeding an allowed speed are detected without taking an unnecessary number of pictures.

13 Claims, 4 Drawing Sheets

TRAFFIC MONITORING DEVICE

TECHNICAL FIELD

The invention relates to a traffic monitoring device particularly for application in a moving monitoring vehicle, comprising a measuring instrument, for example a radar instrument, for measuring the relative speed of a vehicle to be detected with respect to the speed of the monitoring vehicle, speed measuring means for measuring the speed of the monitoring vehicle, recording means for recording the vehicle to be detected, and releasing means automatically releasable at adjustable limit speeds for releasing the recording means.

Thereby photographic documentation can be prepared which shall serve as evidence of violation of traffic regulations.

BACKGROUND ART

It is well known that the driving speed of a vehicle can be measured by means of a stationary radar device and that a radar controlled indication device can be photographed together with the vehicle.

Because it, as a rule, is necessary to release monitoring pictures manually or by means of telecontrol, it is known that electromagnetic releasing means for the shutters exist.

Also, monitoring vehicles are used for traffic monitoring. From German Patent No. 1,139,315 it is known that the monitoring vehicle follows a vehicle with the same speed and prepares a documentary evidence of a vehicle exceeding the allowed speed by means of photographing the vehicle and the speedometer serving as vehicle speed indicator, together with photographically documenting the time and date.

From U.S. Pat. No. 3,206,748 a photographic traffic monitoring device is known, which is adapted to optionally determine the speed of a vehicle to be monitored by following it or by stationary operation by means of radar.

In the brochure TRAFFIPAX-micro speed of the company Traffipax-Vertrieb, Hildener Straße 57, 4000 Dusseldorf 13, a traffic radar device is described, which likewise is adapted for mobile and stationary operation. The device is pivotable such that the traffic monitoring in the stationary operation can be achieved optionally from the left or the right side of the road. The traffic moving away or the approaching traffic can optionally be measured and photographically documented. In stationary operation, separately adjustable limit speeds are provided for passenger cars and motor lorries during monitoring the traffic moving away. The traffic radar device is adapted to be optionally mounted in patrol cars having fixedly mounted support for radar antenna or for mounting the radar antenna on a stand. In suitable vehicles the antenna can be mounted invisibly behind the grille and remain there during travel. For mobile operation the device is provided with an electronic speedometer having digital display. The speedometer is switched-on automatically as soon as the radar device is switched-off. Through corresponding signs at the prepared photo it can be seen whether the device has been operated with radar or with speedometer.

It is disadvantageous if the monitoring vehicle has to be driven with the same speed in the required proximity behind the vehicle to be detected, because it easily can be recognized as a police vehicle. In the brochure GATSO-meter of the company Gatsometer B.V., Tetterodeweg 10, 2050 AA Overveen, a device is mentioned, which likewise is adapted to be used in mobile or stationary operation. With this device it is furthermore possible to use the radar monitoring and the speedometer monitoring in a way that the monitoring vehicle is driven a at constant speed but more slowly than the vehicle to be detected. The speed of the monitoring vehicle and the relative speed, as measured by the radar device of the vehicle to be detected with respect to the speed of the monitoring vehicle, are reflected in a photographic picture of the vehicle to be detected.

In order to obtain evidence as irrefutable as possible, further data, e.g. date and time, are reflected in the picture.

The prior art traffic monitoring device of the above mentioned type, which is mounted in a monitoring vehicle and which serves to monitor the speed, is ineffective. On one hand, the monitoring vehicle has to be driven at constant speed and thus cannot be adapted to the given traffic. On the other hand, too many or too few pictures are taken, which means that vehicles driven too fast are possibly not detected and vehicles are photographed, which do not exceed the allowed speed. This is the case, for example, when the monitoring vehicle is, in fact, driven at constant speed but too fast. Exceeding the allowed speed is partly not recorded, because the radar device does not measure any exceeded speed. When the monitoring vehicle is driven too slowly, the device signals that the allowed speed was exceeded, which actually is not the case. The camera is released and a picture is taken, in which it later can be seen that the allowed speed.

DISCLOSURE OF INVENTION

It is the object of the invention to provide a traffic monitoring device of the above defined type wherein the monitoring vehicle speed can be adapted to the given traffic flow and that every vehicle exceeding a maximally allowed speed also is detected without taking unnecessary pictures.

According to the invention this object is achieved in that summing means are provided, to which the relative speed of the vehicle to be detected and the speed of the monitoring vehicle are applied, and which supplies a corresponding sum value thus corresponding to the absolute speed of the vehicle to be detected, and the releasing means of the camera are triggered depending on this sum value when the sum value exceeds a determined adjustable limit speed.

Therewith the recording means are released dependent on the absolute speed of the vehicle to be detected and not dependent on the relative speed of the vehicle to be detected with respect to the monitoring vehicle.

Embodiments of the invention will now be described in greater detail with reference to the accompanying drawings.

BEST MODE OF CARRYING OUT THE INVENTION

Figure 1:
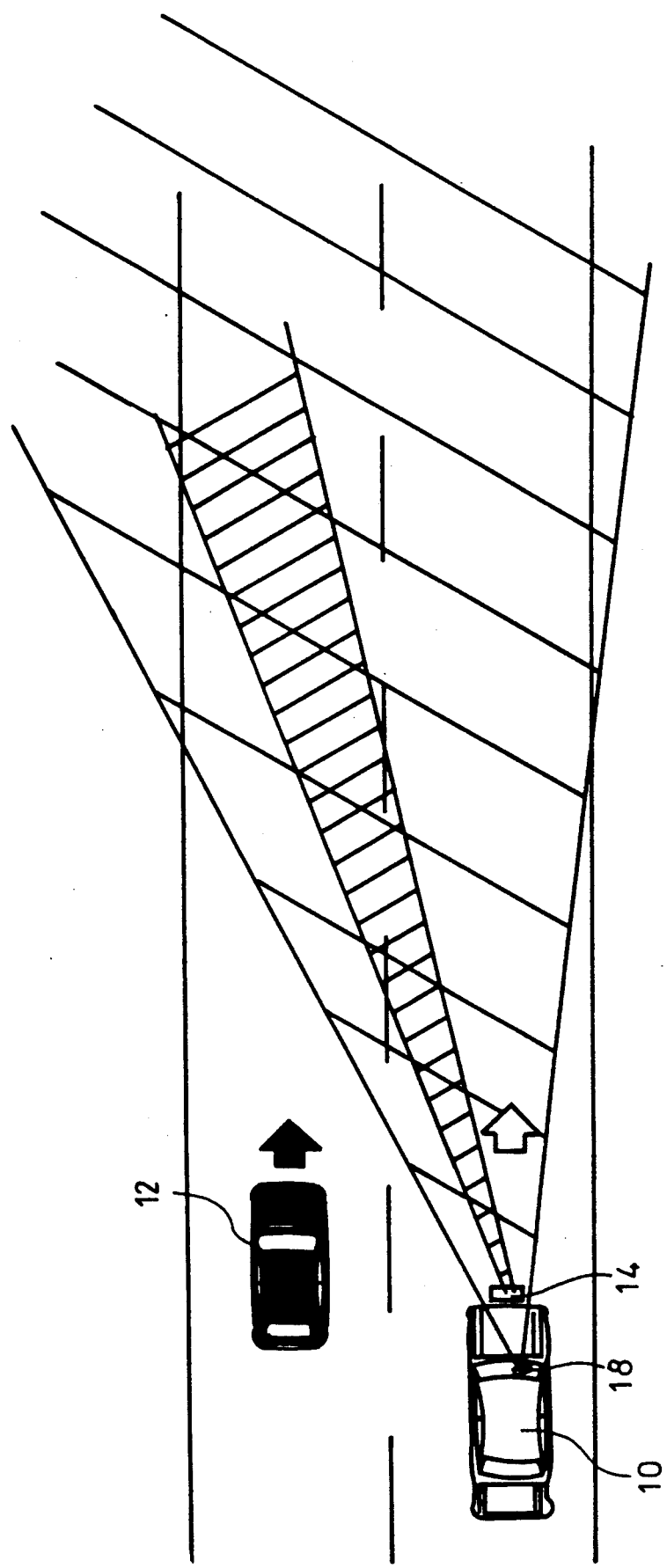
FIG. 1 shows a traffic situation in which a monitoring vehicle is passed by a vehicle to be detected.

In FIG. 1 a usual traffic situation, for example on a freeway, is illustrated. A monitoring vehicle 10 is driven in the right-hand lane and is passed by a vehicle 12 to be detected.

Figure 2:
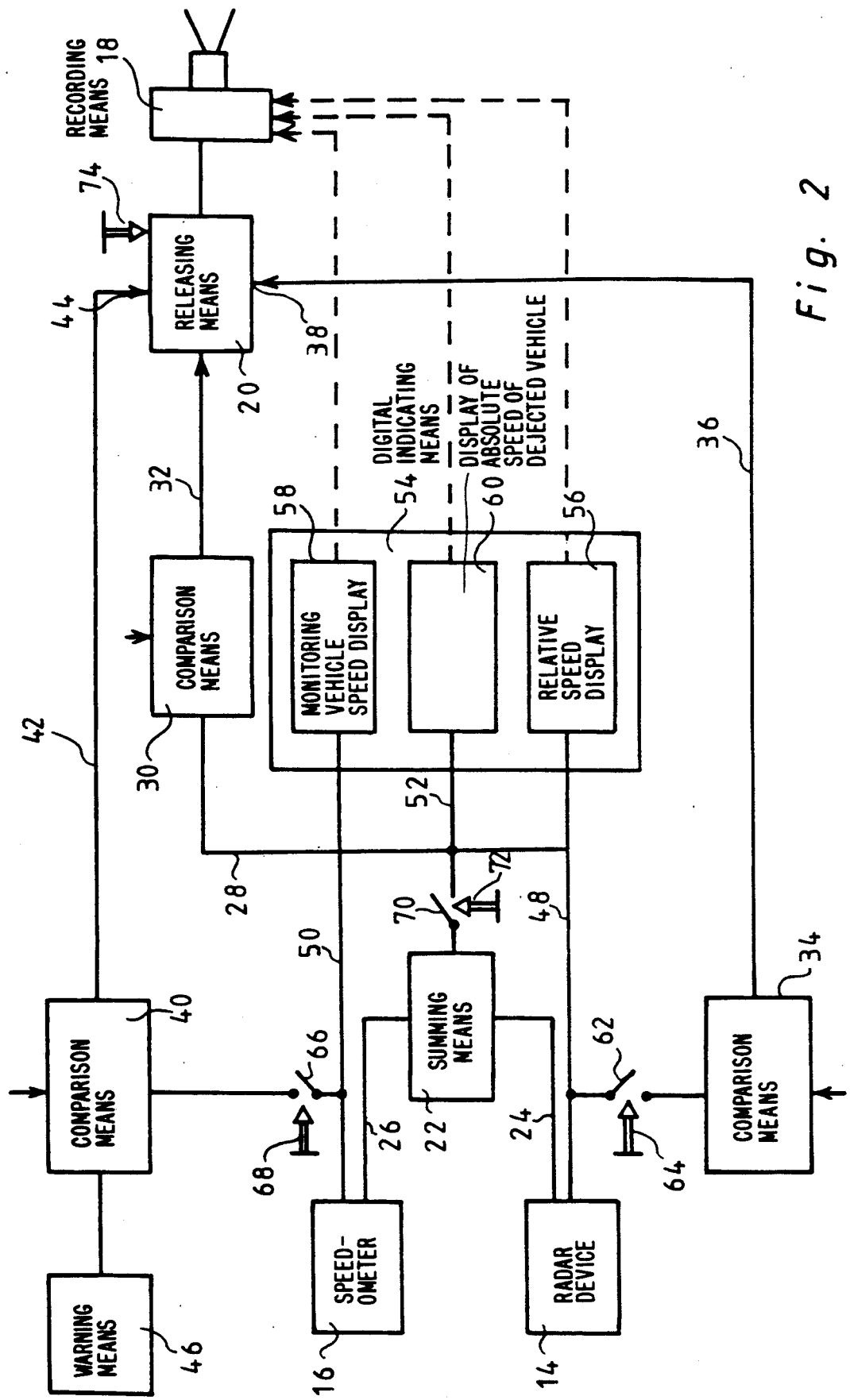
FIG. 2 is a block diagram of a traffic monitoring device according to the invention.

In FIG. 2 a traffic monitoring device according to the invention is illustrated by a block diagram. A radar device 14 measures the relative speed of the vehicle 12 to be detected with respect to the monitoring vehicle 10 and supplies a corresponding signal. In order to measure the speed of the monitoring vehicle 10, it is provided with speed measuring means 16, for example a speedometer, which likewise supplies a corresponding signal. Recording means 18 serve to record the vehicle 12 to be detected. The recording means 18 are released by releasing means 20 automatically releasable at adjusted limit speeds. Through a line 24 the signal from the radar device 14, and through a line 26, the signal from the speed measuring means 16 are applied to summing means 22. The summing means 22 supply a signal corresponding to the sum of the two speeds. This sum corresponds to the absolute speed of the vehicle 12 to be detected. This signal is applied to comparison means 30 through a line 28. In the comparison means 30 the absolute speed of the vehicle 12 to be detected is compared with a limit value adapted to be input. If the absolute speed of the vehicle 12 to be detected exceeds the input limit value, the comparison means 30 supply a signal to the releasing means 20 through a line 32.

The signal from the radar device 14 is likewise applied to comparison means 34, which supply a signal through a line 36 to stop means 38 for the releasing means 20 if the relative speed measured with the radar device 14 of the vehicle 12 to be detected drops below a limit value adapted to be input in the comparison means 34.

The signal from the speed measuring means 16 is likewise applied to comparison means 40, which supply a signal through a line 42 to stop means 44 for the releasing means 20 if the speed of the monitoring vehicle 10 measured by the speed measuring means 16 drops below a lower limit value input in the comparison means 40.

In order to control the speed of the monitoring vehicle, warning means 46 are coupled to the comparison means 40. The warning means 46 supply an acoustic and/or optical signal to the driver if the monitoring vehicle 10 drops below or exceeds the lower or upper limit values input in the comparison means 40. Furthermore, or as an alternative thereto, a speed controller (not illustrated in FIG. 1) adapted to be switched-on and -off can be provided, by means of which the speed of the monitoring vehicle 10 automatically is kept between the limit values input in the comparison means 40.

The speed signals from the radar device 14, from the speed measuring means 16 and from the summing means 22 are applied through lines 48, 50 and 52, respectively, to digital indication means 54, which are described hereinbelow in greater detail with reference to FIG. 3. The indication means 54 comprise at least one display 56 of the relative speed of the vehicle 12 to be detected, one display 58 of the speed of the monitoring vehicle 10 and one display 60 of the absolute speed of the vehicle 12 to be detected.

The automation of the releasing means 20 in response to a signal sent to the releasing means 20 from controlled controlled by, the comparison means 30, 34 and 40, can be switched-off. For example switches 62, 66 and 70 and push-buttons 64, 68, 72 and 74 are provided to this end. Hereby the recording means can be released manually when the monitoring vehicle, for example, is driven at the same speed behind the vehicle to be detected. Thereby it is also possible to park the monitoring vehicle 10 on the roadside and to use the traffic monitoring device as a stationary radar device. To this end the traffic monitoring device has to be adjustable in several defined positions relative to the monitoring vehicle 10. To this end the traffic monitoring device is pivotable and arranged to be stopped in several positions. With regard to other details these manners of traffic monitoring are known and not described in greater detail herein.

As indicated by broken lines in FIG. 2, the relative and absolute speeds of the vehicle 12 to be detected and the speed of the monitoring vehicle 10 are recorded on the picture achieved by means of the recording means 18.

Figure 3:
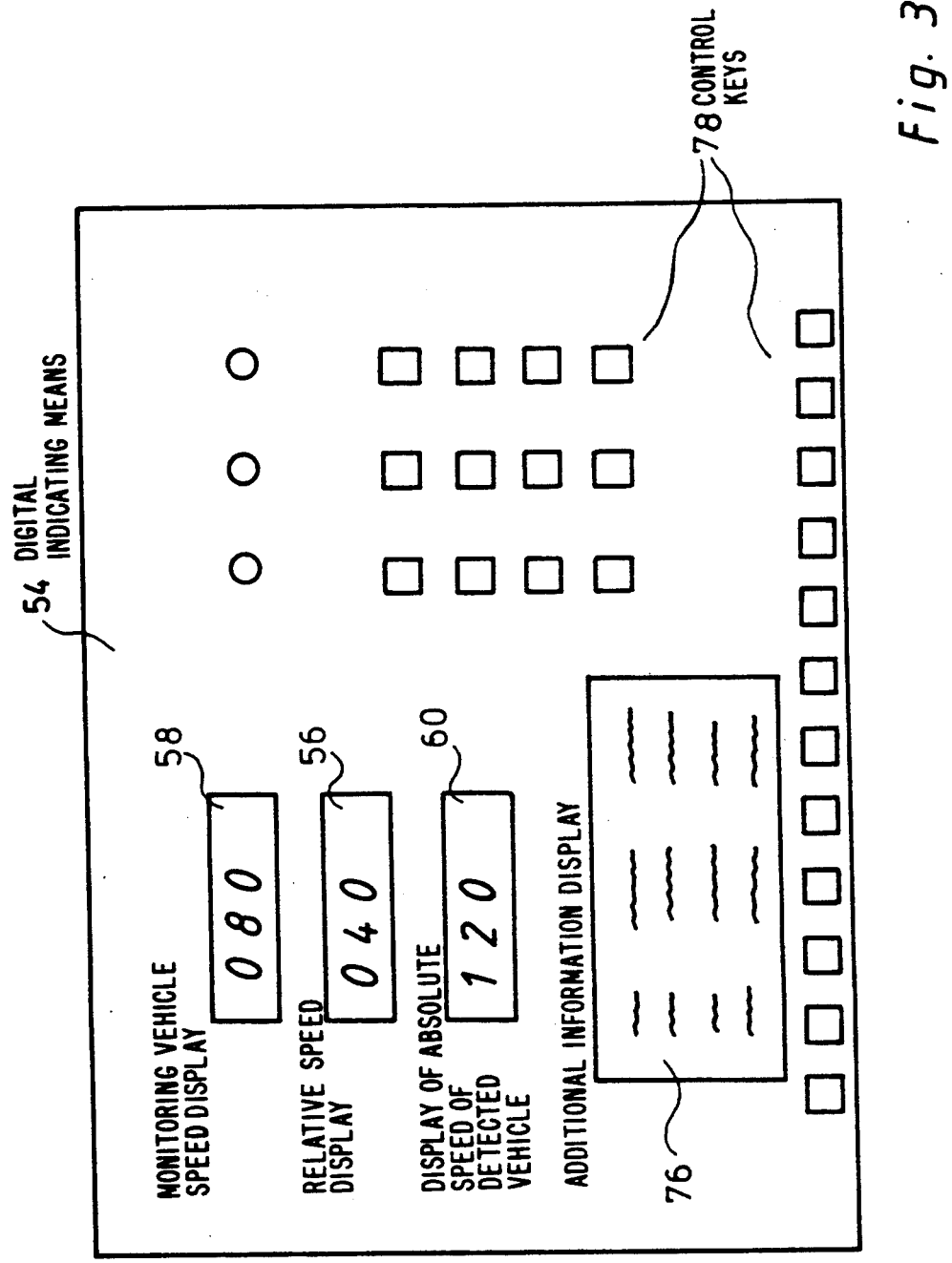
FIG. 3 shows schematically the indication means of FIG. 1.

In FIG. 3 an embodiment of the indication means 54 is illustrated schematically. For example, the upper display 58 indicates the speed of the monitoring vehicle 10, the middle display 56 indicates the relative speed and the lower display 60 indicates the absolute speed of the vehicle 12 to be detected. Numeral 76 indicates a further display, in which further information, e.g. time information, adjustable by means of control keys 78 is illustrated. Such displays are already used in typical traffic monitoring devices and thus are not described in greater detail herein.

Figure 4:
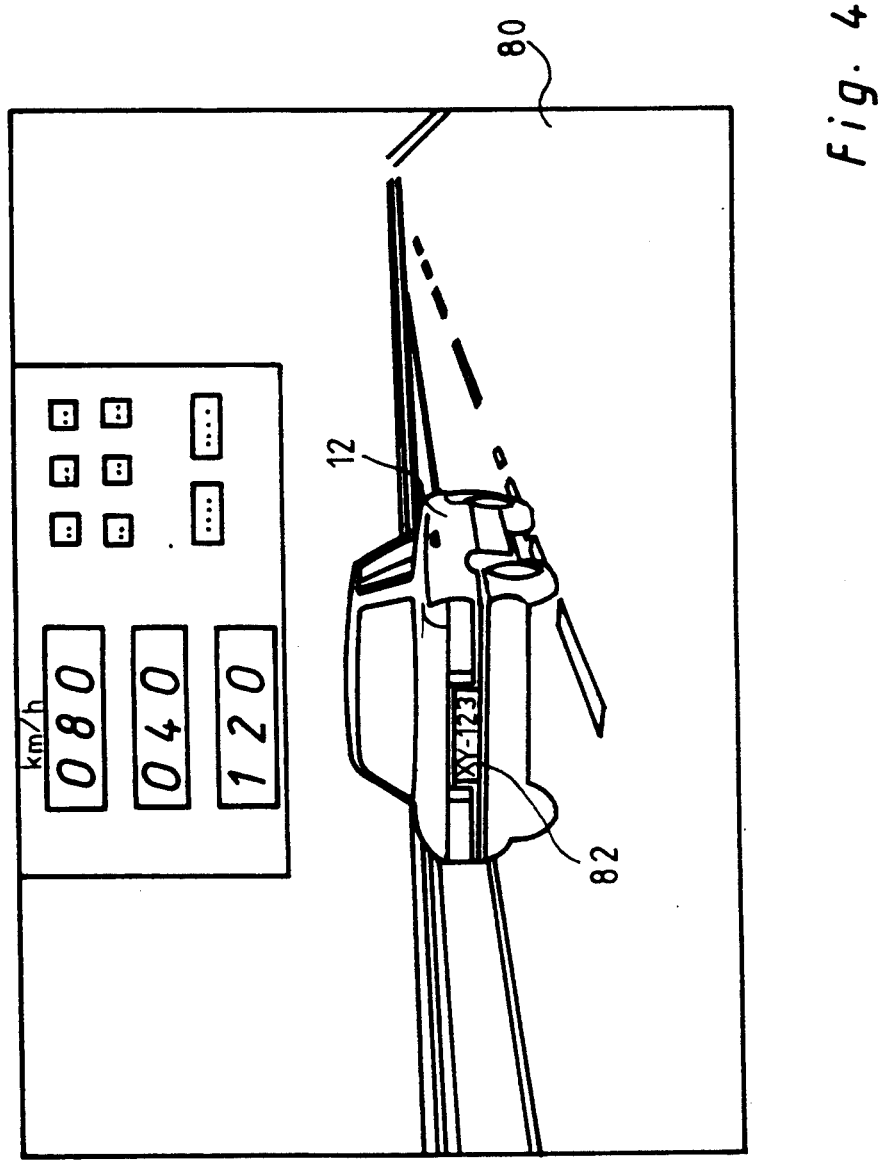
FIG. 4 shows a photographic documentation of the vehicle to be detected achieved by means of the traffic monitoring device.

The recording means 18 are preferably a photographic camera for preparing a photographic documentation 80 of the vehicle 12 to be detected. Such a documentation 80 is illustrated in FIG. 4. The indication means 54 are reflected into the photographic documentation 80 and the instantaneous mode of operation of the traffic monitoring device is indicated. However, it is also possible to record the information on the film rim.

The described arrangement operates as follows:

A lower limit value is input in the comparison means 34 for the speed of the vehicle to be detected measured by means of the radar device 14. This limit value depends on the range of accuracy of the radar device 14 and shall be 20 km/h in the numerical example set forth herein.

A lower and an upper limit value are input in the comparison means 40 for the speed of the monitoring vehicle 10 measured by means of the speed measuring means 16. The lower limit value depends on the range of accuracy of the speed measuring means 16 and shall be 25 km/h herein. The upper limit value depends on the maximally allowed speed at the road section in question and on the lower limit value for the speed measured by means of the radar device 14. This upper limit value is obtained by subtracting the lower limit value for the speed measured by means of the radar device 14 from the maximally allowed speed. In the numerical example performed herein it is assumed that the maximally allowed speed is 100 km/h. Accordingly the upper limit value of the comparison means 40 is 80 km/h (100 *km/h*−20 *km/h*=80 *km/h*).

A limit value is likewise input in the comparison means 30 for the absolute speed of the vehicle 12 to be detected and obtained by means of the summing means 22. This limit value corresponds to the maximally allowed speed and is thus 100 km/h.

When the monitoring vehicle 10 is passed by a vehicle 12, the speed of this vehicle 12 is measured by means of the radar device 14. Only when the speed of the vehicle 12 exceeds the maximally allowed speed of 100 km/h, for example, 120 km/h, a releasing signal is applied from the comparison means 30 to the releasing means 20 whereby the recording means 18 are released. For example, a photographic documentation 80 of the vehicle 12 to be detected is prepared. By means of suitable optical systems, and suitable arrangement of the radar device 14 and the recording means 18, it is ensured that the vehicle 12 and the license number 82 of the vehicle 12 can be clearly ascertained and that the vehicle 12 is centrally in the documentation 80. The indication means 54 with the corresponding data (see FIG. 1) are reflected in the documentation 80 and are also seen therein. Therefore, the indicated relative speed of the vehicle 12 to be detected and the indicated speed of the monitoring vehicle 10 do not just serve as information but also for checking the calculated absolute speed of the vehicle 12 to be detected.

When the monitoring device 10 is driven more slowly than the lower limit speed of 25 km/h input in the comparison means 40, such that the speed measuring means 16 supply a value which is too inexact, the comparison means 40 apply a blocking signal to the releasing means 20 and blocks the releasing means 20. When the monitoring vehicle 10 is driven faster than the upper limit speed of 80 km/h input in the comparison means 40, for example 95 km/h, the vehicle 12 driven at a speed between 100 km/h and 115 km/h are not detected, which is undesirable. In order to avoid the problem with dropping below or exceeding the limit values, the comparison means 40 are coupled with warning means which supply a signal to the driver when the limit values are fallen below or exceeded, respectively.

Furthermore, a speed controller can be provided, by means of which the speed of the monitoring vehicle 10 automatically can be kept between the limit values input in the comparison means 40.

Thus, with this traffic monitoring device, all vehicles exceeding a maximally allowed speed are detected without taking too many pictures. The monitoring vehicle 10 need not be driven at a predetermined constant speed, and it can travel along with the normally varying traffic flow.

I claim:

1. A traffic monitoring device particularly for use with a moving monitoring vehicle, comprising
    a measuring instrument for measuring the relative speed of a vehicle to be detected with respect to the speed of the monitoring vehicle,
    a speed measuring means for measuring the speed of the monitoring vehicle,
    signal evaluation means to which
        a relative speed signal from said measuring instrument indicative of the relative speed of the vehicle to be detected,
        the monitoring vehicle speed signal from the speed measuring means,
        an adjustable limit speed signal,
        a minimum relative speed signal, and
        a minimum monitoring vehicle speed signal
    are applied, and which comprises
        means for comparing the speed of the vehicle to be detected with said limit speed, said comparison using said relative speed signal and taking into account said monitoring vehicle speed signal,
        means for comparing said monitoring vehicle speed signal with said minimum monitoring vehicle speed signal,
        means for comparing said relative speed signal with said minimum relative speed signal, and
        means for providing a releasing signal,
            if said comparison indicates exceeding of said limit speed by said vehicle to be detected, and
            provided said monitoring vehicle speed signal exceeds said minimum monitoring vehicle speed signal, and
            further provided said relative speed signal exceeds said minimum relative speed signal, and
    a photographic camera for photographing the vehicle to be detected, and releasing means triggered by said releasing signal for automatically releasing said photographic camera.

2. A traffic monitoring device as claimed in claim 1, in which warning means are provided, which are adapted to be switched-on and -off and which supply an acoustic and/or optical signal when the speed of the monitoring vehicle drops below a predetermined lower limit value.

3. A traffic monitoring device as claimed in claim 1 in which warning means are provided, which are adapted to be switched-on and -off and which supply an acoustic and/or optical signal when the speed of the monitoring vehicle exceeds a predetermined upper limit value.

4. A traffic monitoring device as claimed in claim 1, in which a speed controller is provided, which is adapted to be switched-on and -off and by means of which the speed of the monitoring vehicle automatically is kept between said predetermined limit values.

5. A traffic monitoring device as claimed in claim 1, in which digital indication means are provided for indicating the relative speed and an absolute speed of the vehicle to be detected and the speed of the monitoring vehicle.

6. A traffic monitoring device as claimed in claim 1, in which the automation of the releasing means is adapted to be switched-off so that the releasing means may be manually activated whereby the traffic monitoring device is capable of use as a stationary traffic monitoring device in the form of a radar device.

7. A traffic monitoring device as claimed in claim 5, in which the relative and absolute speeds of the vehicle to be detected and the speed of the monitoring vehicle are adapted to be recorded in a photograph achieved by means of said photographic camera.

8. A traffic monitoring device as claimed in claim 1, in which said photographic camera is used for preparing photographic documentation of the vehicle to be detected.

9. A traffic monitoring device as claimed in claim 8, in which the display of said indication means is contained in the photographic documentation.

10. A traffic monitoring device as claimed in claim 6, in which an instantaneous mode of operation of the traffic monitoring device is adapted to be indicated and recorded.

11. A traffic monitoring device as claimed in claim 1, wherein the traffic monitoring device is pivotable.

12. A traffic monitoring device as claimed in claim 11, wherein the traffic monitoring device is adapted to be stopped in one or several predetermined positions.

13. A traffic monitoring device as claimed in claim 1, wherein the traffic monitoring device is removable.

* * * * *